Patented Nov. 25, 1930

1,782,682

UNITED STATES PATENT OFFICE

LEON W. GELLER, OF HAMBURG, NEW YORK, ASSIGNOR TO NATIONAL ANILINE & CHEMICAL CO. INC., OF NEW YORK, N. Y., A CORPORATION OF NEW YORK

DISAZO DYE CONTAINING A DIPHENYLUREA NUCLEUS

No Drawing. Application filed April 28, 1924. Serial No. 709,684.

This invention relates to the manufacture and production of new azo dyes which are of value for dyeing unmordanted cotton. They also dye wool, silk, and other fibres. The dyed fabrics, or other material, dyed with the new dyestuffs also form a part of the present invention.

The new dyestuffs can be obtained by causing phosgene to act on a mixture comprised of different or of equimolecular proportions of 4-hydroxy-4'-aminoazobenzene-5-carboxylic acid and 2.2'-dimethyl-5-alkoxy-4-aminoazobenzene-5'-sulfonic acid, e. g. 2.2'-dimethyl-5-methoxy (or ethoxy)-4-aminoazobenzene-5'-sulfonic acid, etc., in the presence of a substance adapted to absorb hydrochloric acid such as, for example, sodium carbonate or other acid binding agent.

The new dyestuffs are probably mixtures comprising the following three compounds or bodies:

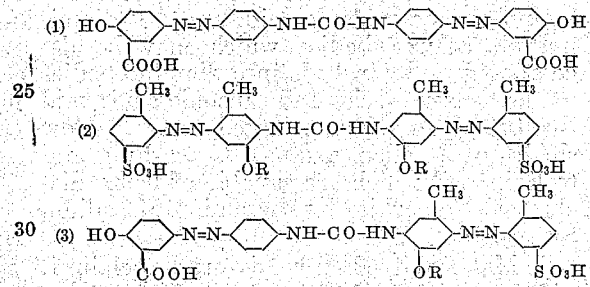

where R denotes an alkyl group.

The new dyes thus obtained, in the dried and pulverized state and in the form of their alkali metal salts, are reddish brown powders soluble in water with a yellow color and soluble in concentrated sulfuric acid with a yellowish red color. Upon reduction with stannous chloride and hydrochloric acid they yield 2-hydroxy-5-amino benzoic acid, 4-methyl-3-amino-benzene sulfonic acid and 4.4'-diaminodiphenylurea bodies which upon hydrolysis decompose into diamines or diamino bodies of the benzene series, and carbonic acid. They are valuable substantive dyestuffs and dye unmordanted cotton yellow shades of excellent fastness to washing and to light and which are capable of being discharged to a white with discharging agents.

The following specific example will further illustrate the invention, but it is understood that the invention is not limited thereto. The parts are by weight.

*Example.*—279 parts (1 mol) of the sodium salt of 4-hydroxy-4'-aminoazobenzene-5-carboxylic acid (prepared by coupling 1 mol of diazotized p-nitraniline with 1 mol of salicylic acid and subsequently reducing the nitro group to an amino group, or by coupling 1 mol of diazotized p-aminoacetanilide with 1 mol of salicylic acid and subsequently replacing the acetyl group by hydrogen through saponification) are dissolved in 10,000 parts of water and mixed with a solution of 357 parts (1 mol) of the sodium salt of 2.2'-dimethyl-5-methoxy-4-aminoazobenzene-5'-sulfonic acid (prepared by coupling 1 mol of diazotized 3-amino-4-methylbenzene-1-sulfonic acid with 1 mol of 4-methyl-2-amino-1-methoxybenzene) in 25,000 parts of water. Into this solution, with stirring, and which is kept alkaline by the addition of sufficient sodium carbonate, phosgene is introduced at ordinary temperature until no unchanged monazo dye is any longer present. The reaction is finished when a small test sample of the solution on bibulous paper shows only a faint pink color when spotted with hydrochloric acid. When the reaction is complete, the new dye is precipitated by the addition of common salt, filtered off, pressed and dried.

The new dyestuff thus obtained, after being dried and pulverized in the shape of its sodium salt, is a reddish brown powder soluble in water with a yellow color, and soluble in concentrated sulfuric acid with a yellowish red color which upon dilution with ice gives a precipitate of a dark violet color; yielding upon reduction with stannous chloride and hydrochloric acid, 2-hydroxy-5-amino-benzoic acid, 4-methyl-3-amino-benzene sulfonic acid, and 4.4'-diaminodiphenyl urea bodies, which may be further decomposed by hydrolysis into diamines or diamino bodies of the benzene series, and carbonic acid. It dyes unmordanted cotton brilliant yellow shades which are of excellent fastness to washing and to light and capable of being discharged to a white with discharging agents such as, for example, sodium hydrosulfite. Instead of subjecting a mixture of equimolecular proportions of the above mentioned aminoazo compounds to the action of phosgene, a mixture comprising other proportions can be employed whereby dyestuffs dyeing other shades or tints of yellow are produced. For example, a mixture comprising 1.1 to 1.5 molecular proportions of 4-hydroxy-4'-aminoazobenzene-5-carboxylic acid to one molecular proportion of 2.2'-dimethyl-5-methoxy-4-aminoazobenzene-5'-sulfonic acid gives, when phosgenated, dyestuffs which dye greener shades of yellow than those produced by using equimolecular proportions whereas if 0.5 to 0.9 molecular proportion of the former are employed to one proportion of the latter then dyestuffs dyeing redder shades are produced. It is to be understood that this invention includes dyestuffs which can be prepared by phosgenating mixtures comprised of equimolecular or of different molecular proportions of the above mentioned aminoazo compounds. Analogous dyestuffs possessing similar qualities are produced by treating with phosgene in a similar manner, a mixture comprised of 4-hydroxy-4'-aminoazobenzene-5-carboxylic acid and 2.2'-dimethyl-5-ethoxy-4-aminoazobenzene-5'-sulfonic acid. In the specification and claims it will be understood that the term "alkoxy" denotes and includes alkyl substituted hydroxyl groups, such as—$OCH_3$ (methoxy),—$OC_2H_5$ (ethoxy), etc.

I claim:

1. As a new disazo dyestuff, the product consisting of a mixture of the one asymmetrical and the two symmetrical disazo compounds containing a diphenylurea nucleus obtained by subjecting a mixture of 4-hydroxy-4'-aminoazobenzene-5-carboxylic acid and 2.2'-dimethyl-5-alkoxy-4-aminoazobenzene-5'-sulfonic acid in the presence of sodium carbonate to the action of phosgene, said dyestuffs, in the dried and pulverized state and in the shape of their sodium salt, being reddish brown powders soluble in water with a yellow color and soluble in concentrated sulfuric acid with a yellow red color; yielding upon reduction with stannous chloride and hydrochloric acid, 2-hydroxy-5-amino-benzoic acid, 4-methyl-3-amino-benzene sulfonic acid, and 4.4'-diaminodiphenylurea bodies which upon hydrolysis decompose into amino bodies of the benzene series and carbonic acid; and dyeing unmordanted cotton reddish yellow to greenish yellow shades which are capable of being discharged to a white with discharging agents.

2. As a new disazo dyestuff, the product consisting of a mixture of the one asymmetrical and the two symmetrical disazo compounds containing a diphenylurea nucleus obtained by subjecting an aqueous solution containing a mixture of one-half to one and one-half molecular proportions of 4-hydroxy-4'-aminoazobenzene-5-carboxylic acid and one molecular proportion of 2.2'-dimethyl-5-methoxy-4-aminoazobenzene-5'-sulfonic acid in the presence of sodium carbonate to the action of phosgene, said dyestuffs in the dry and pulverized state and in the shape of their sodium salts being reddish brown powders soluble in water with a yellow color, yielding upon reduction with stannous chloride and hydrochloric acid 2-hydroxy-5-aminobenzoic acid, 4-methyl-3-aminobenzene sulfonic acid, and 4.4'-diaminodiphenylurea bodies which may be decomposed by hydrolysis into diamino bodies of the benzene series and carbonic acid; said dyestuffs dying unmordanted cotton yellow shades which are capable of being discharged with discharging agents.

3. As a new disazo dyestuff, the product consisting of a mixture of the one asymmetrical and the two symmetrical disazo compounds containing a diphenylurea nucleus obtained by subjecting an equimolecular mixture of 4-hydroxy-4'-aminoazobenzene-5-carboxylic acid and 2.2'-dimethyl-5-methoxy-4-aminoazobenzene-5'-sulfonic acid in the presence of sodium carbonate to the action of phosgene, said dyestuff, in the dried and pulverized state and in the form of its sodium salt, being a reddish brown powder soluble in water with a yellow color and soluble in concentrated sulfuric acid with a yellowish red color, and upon reduction with stannous chloride and hydrochloric acid yielding 2-hydroxy-5-amino-benzoic acid, 4-methyl-3-aminobenzene sulfonic acid, and 4.4'-diaminodiphenylurea bodies which may be decomposed by hydrolysis into diamino bodies of the benzene series and carbonic acid; said dyestuff dyeing unmordanted cotton yellow shades of excellent fastness to washing and to light and which are capable of being discharged to a white by the action of sodium hydrosulfite.

4. Material dyed with a dyestuff of claim 1.

5. Material dyed with a dyestuff of claim 2.

6. Material dyed with the dyestuff of claim 3.

7. As a new product, a dyestuff comprising a diphenylurea disazo compound having the following probable formula:

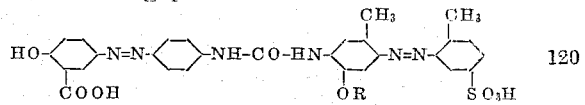

where R signifies an alkyl group.

8. As a new product, a dyestuff comprising a diphenylurea disazo compound having the following probable formula:

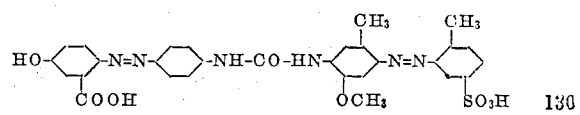

9. Material dyed with the dyestuff of claim 7.

10. Material dyed with the dyestuff of claim 8.

11. In the process of producing a disazo dye, the steps which comprise subjecting a mixture of 4-hydroxy-4'-aminoazobenzene-5-carboxylic acid and 2.2'-dimethyl-5-alkoxy-4-aminoazobenzene-5'-sulfonic acid to the action of phosgene in the presence of an acid binding agent, and isolating the resultant dyestuff.

12. In the process of producing a disazo dye, the steps which comprise subjecting a mixture of equimolecular proportions of 4-hydroxy-4'-aminoazobenzene-5-carboxylic acid and 2.2'-dimethyl-5-alkoxy-4-aminoazobenzene-5'-sulfonic acid to the action of phosgene in the presence of an acid binding agent, salting out the resulting dyestuff, filtering and drying.

13. In the process of producing a disazo dyestuff, the steps which comprise subjecting a mixture of one-half to one and one-half molecular proportions of 4-hydroxy-4'-aminoazobenzene-5-carboxylic acid and one molecular proportion of 2.2'-dimethyl-5-methoxy-4-aminoazobenzene-5'-sulfonic acid to the action of phosgene in the presence of an acid binding agent, and isolating the resultant dyestuff.

In testimony whereof I affix my signature.

LEON W. GELLER.